(12) United States Patent
Ngai

(10) Patent No.: US 6,891,828 B2
(45) Date of Patent: May 10, 2005

(54) DUAL-LOOP BUS-BASED NETWORK SWITCH USING DISTANCE-VALUE OR BIT-MASK

(75) Inventor: Henry P. Ngai, Coto De Caza, CA (US)

(73) Assignee: Network Excellence for Enterprises Corp., Irvine, CA (US)

( * ) Notice: Subject to any disclaimer, the term of this patent is extended or adjusted under 35 U.S.C. 154(b) by 836 days.

(21) Appl. No.: 09/681,268

(22) Filed: Mar. 12, 2001

(65) Prior Publication Data

US 2002/0126661 A1 Sep. 12, 2002

(51) Int. Cl.7 ............................................. H04L 12/50
(52) U.S. Cl. ...................... 370/357; 370/400; 370/424
(58) Field of Search ................................ 370/351, 357, 370/360, 362, 364, 386–389, 392, 396, 400, 422–424

(56) References Cited

U.S. PATENT DOCUMENTS

| | | | |
|---|---|---|---|
| 4,566,097 A | 1/1986 | Bederman | 370/89 |
| 4,766,530 A | 8/1988 | Roslund | 364/200 |
| 4,780,870 A * | 10/1988 | McHarg et al. | 370/415 |
| 4,926,418 A | 5/1990 | Cidon et al. | 370/85.5 |
| 5,053,946 A | 10/1991 | Jain | 364/200 |
| 5,119,481 A * | 6/1992 | Frank et al. | 710/100 |
| 5,155,725 A | 10/1992 | Khalil | 370/85.5 |
| 5,257,264 A * | 10/1993 | Yang et al. | 370/453 |
| 5,280,582 A | 1/1994 | Yang et al. | 395/200 |
| 5,305,306 A | 4/1994 | Spinney et al. | 370/29 |
| 5,349,583 A | 9/1994 | Christensen et al. | 370/85.5 |
| 5,490,145 A | 2/1996 | Tanabe et al. | 370/85.4 |
| 5,566,177 A | 10/1996 | Bhandari et al. | 370/85.5 |
| 5,572,526 A | 11/1996 | Cidon et al. | 370/85.5 |
| 5,598,414 A | 1/1997 | Walser et al. | 370/455 |
| 6,035,340 A | 3/2000 | Fischer et al. | 709/249 |
| 6,330,245 B1 * | 12/2001 | Brewer et al. | 370/424 |
| 6,546,010 B1 * | 4/2003 | Merchant et al. | 370/389 |
| 6,553,027 B1 * | 4/2003 | Lam et al. | 370/386 |
| 6,760,341 B1 * | 7/2004 | Erimli et al. | 370/412 |

* cited by examiner

Primary Examiner—Hassan Kizou
Assistant Examiner—Dmitry Levitan
(74) Attorney, Agent, or Firm—Stuart T. Auvinen

(57) ABSTRACT

A network switch routes switch packets among nodes with input and output ports. The nodes are connected together in a loop by two buses. One bus sends packets in a clockwise direction around the loop of nodes, while the other bus sends packets in a counter-clockwise direction around the loop. Each bus is divided into links between adjacent nodes, which examine and forward the packets to the next node in the loop. A packet is duplicated and injected onto both buses from a source node, reaching half of the nodes in one direction, and the other nodes in the opposite direction. A distance value in the packet header is set to half of the number of nodes so that the packet is removed after traveling half-way around the loop. A bit-mask in the header indicates nodes to receive the packet, or source-monitoring can remove packets half-way around the loop.

19 Claims, 10 Drawing Sheets

DUAL-LOOP BUS-BASED NETWORK SWITCH USING DISTANCE-VALUE OR BIT-MASK

BACKGROUND OF INVENTION

This invention relates to network switches, and more particularly to bus-based network switches.

The rapid expansion of modern computer networks such as the Internet has fueled the need for faster network switches. Software-based routers and hardware-based network switches are used at intermediate points in networks to either route packets or make direct connections between input and output ports connected to various network nodes. The nodes can be other networks such as local-area networks (LAN's), computers such as PC's, servers, and workstations, or peripheral devices such as printers or storage devices.

Various topologies have been used for networks and for the network switches themselves. Ethernet uses a single bus, perhaps with several segments or branches, that connects to the various nodes. Token ring connects the nodes together in a loop or ring, with one node passing messages along the ring to the next node. Once the packet travels completely around the ring to the first station, the packet is removed.

Dual-ring Fiber-Distributed-Data Interface (FDDI) uses two parallel rings to connect the nodes. One ring provides a backup should a link failure occur on the other ring. While these topologies are used for the networks themselves, network switches that connect these kinds of networks together have tended to be cross-connect switches that allow any pair of ports to connect together through a switching fabric. Store-and-forward switches in a matrix-like switching fabric have also been used for network switches.

While these network switches have been useful, a network switch that uses a bus-like topology rather than a matrix-fabric topology is desired. An efficient bus-based network switch is desired.

DETAILED DESCRIPTION

The present invention relates to an improvement in network switches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
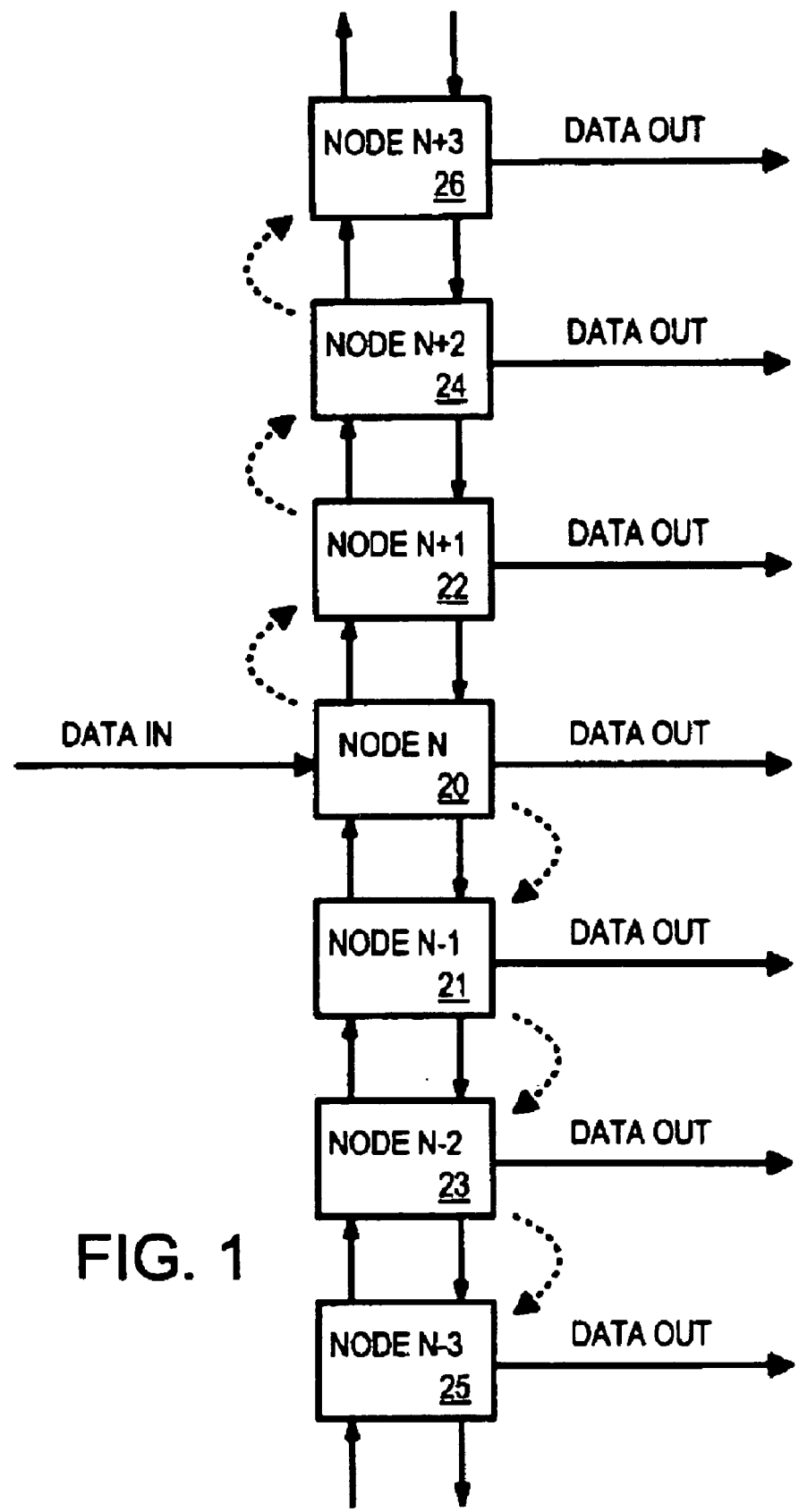
FIG. 1 is a diagram of a bus-based network switch.

FIG. 1 is a diagram of a bus-based network switch. The network switch is a device for routing packets from one port to another port. Several ports are available on the network switch. A network cable can be plugged into a connector for each port, allowing the port to connect to another network node, computer, peripheral, router, or other remote network device. The network switch routes packets of data from one port (an input port) to another port (an output port). Typically, each port is bidirectional, having an input port that receives packet from a remote node, and an output port that transmits data to the same remote node. A pair of separate cables, or a cable bundle can be routed from the network switch to the remote network device.

The network switch has a series of nodes 20–26, each of which can be connected to an input port and to an output port. A pair of buses connects the nodes together. One bus transmits data packets in an upward direction, while the other bus transmits packets in a downward direction.

For example, a data packet is input to the input port that connects to node 20 (node N). The packet is replicated, and one copy is sent up from node 20 to node 22 (node N+1), while the other packet is sent down from node 20 to node 21 (node N−1). The upward packet is passed from node 22 to node 24 (node N+2) and on to node 26 (node N+3). The downward packet is passed from node 21 to node 23 (node N−2), and on to node 25 (node N−3).

Each of the nodes reads the packet's header for the destination address. The destination address can be looked up in a routing table to determine if the packet should be transmitted out the output port connected to the node. Alternately, the node number coupled to the destination port can be stored in the packet header and directly read and compared to the node number (N, N+2, etc.).

Once the packet reaches the node with the matching destination port, the packet can be removed and not sent on to the next node. However, if the packet is a multi-cast packet or broadcast packet rather than a unicast packet, it is not removed until the end node is reached. This allows the packet to be copied by each node and transmitted through the output ports of several nodes. Unicast packets can be sent in just one direction and removed when they reach their one destination node when an intelligent routing algorithm is used.

The buses can be high-speed buses, since they are each divided into small links between two adjacent nodes. Each node examines the packet and forwards it to the next node using the next link in the bus.

The data packet injected at node N reaches all nodes in the switch through just 3 links or hops. Since node N is in the middle of all the other nodes, the distance to the remotest nodes is minimal. However, data packets can be input from any of the other nodes, and larger routing distances can occur.

Figure 2:
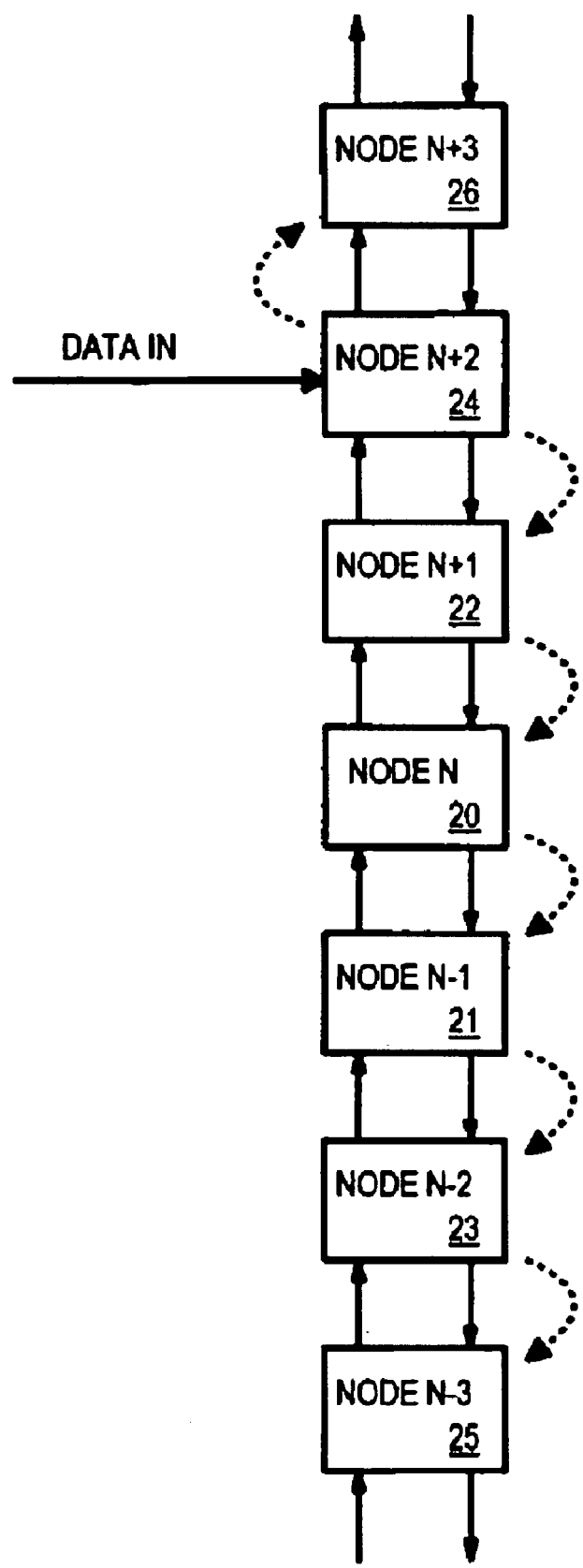
FIG. 2 shows the bus-based network switch routing packets injected from another node farther from the middle.

FIG. 2 shows the bus-based network switch routing packets injected from another node farther from the middle. When a data packet is input to the port connected to node 24, a longer routing distance can occur. A unicast packet can be sent upward from node 24 to node 26, or downward from node 24 to node 22. In the worst case, the unicast packet input to node 24 (N+2) is to be output from the output port connected to node 25 (N−3). The packet must be passed from node 24 down to node 22, then to node 20, and on through nodes 21 and 23 before reaching node 25. The packet must be forwarded over a total of 5 links.

The worst-case distance is thus increased from 3 links to 5 links in this example. In the worst case, the packet is injected at one end node and must be sent to the other end node, through all nodes. For this example of 7 nodes, the worst-case distance is 6.

Actual network switches can have many ports and many nodes. For example, a 100-port network switch with 100 nodes could have a worst-case distance of 99 links using the bus topology. The variation in packet latency through the switch makes this topology undesirable, since a packet could require anywhere from 1 to 99 bus cycles to reach the output port. For even larger network switches the problem prohibits the use of this topology.

Figure 3:
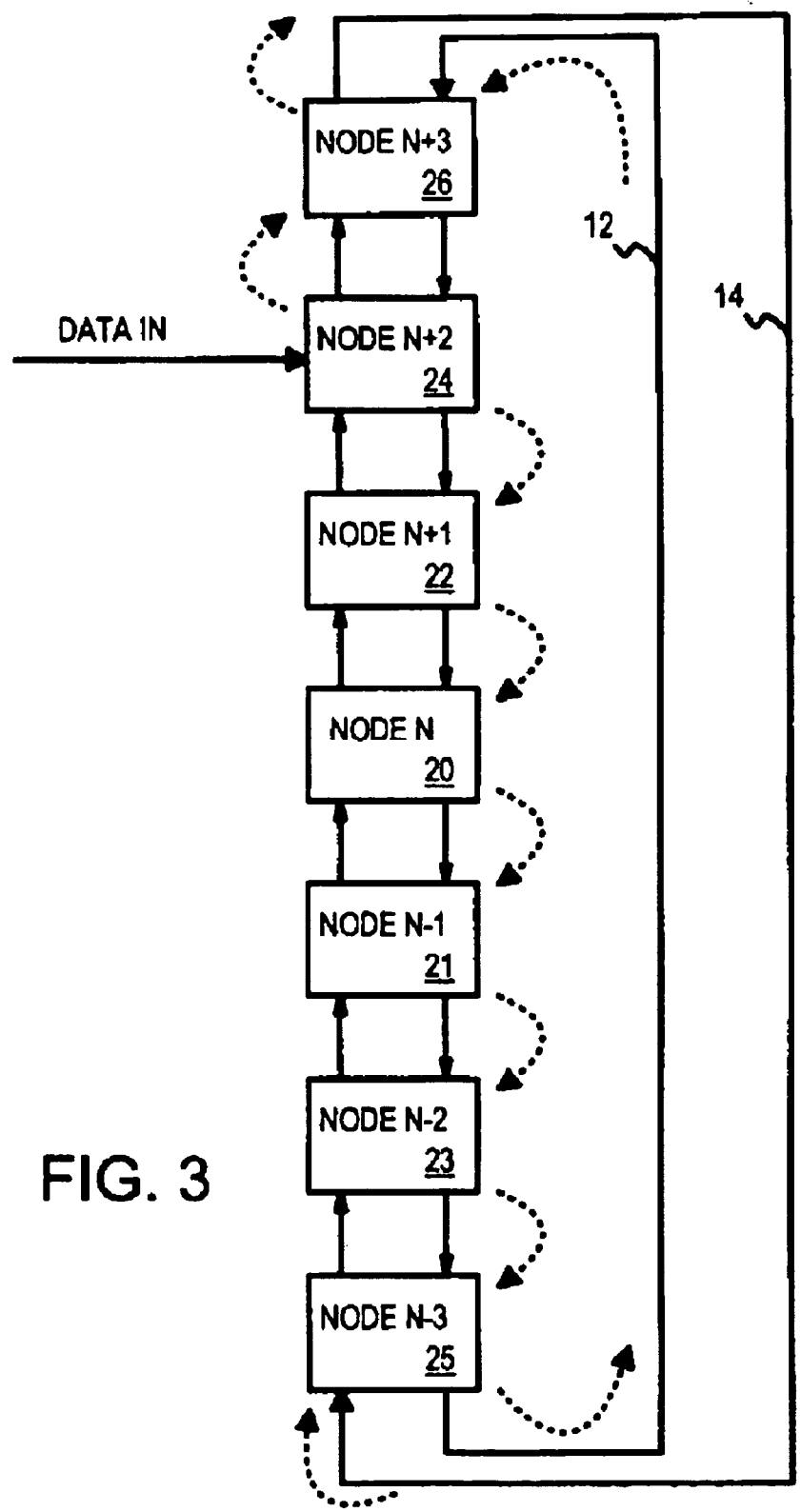
FIG. 3 shows a bus-based network switch with loop-back.

FIG. 3 shows a bus-based network switch with loop-back. All nodes on the bus can act as middle nodes when the end nodes are connected together to form a loop. Top node 26 is connected directly to bottom node 25 using buses 12, 14, which loop back from top to bottom. Bus 14 is used to send packets from top node 26 to bottom node 25, while bus 12 is used to send packets from bottom node 25 to top node 26.

All nodes are thus connected together in a loop using 2 buses. One bus transmits packets upward and back down bus 14 in a clockwise fashion, while the other bus transmits packets downward and back up bus 12 in a counter-clockwise fashion.

All nodes in the loop now have the same maximum or worst-case distance, since any node can be reached by a packet traveling half-way around the loop. For example, bottom node 25 can be reached by a packet injected at node 24 in only 2 hops by sending the packet upward from node 24 to node 26, and then using loop-back bus 14 to reach bottom node 25 on the second hop. Without loop-back bus 14, the packet has to be sent downward through nodes 22, 20, 21, and 23 before reaching bottom node 25 in 5 hops.

Any node on the bus can be reached within about M/2 hops, where M is the total number of nodes. All nodes act as middle nodes, since nodes can be reached in either direction.

Unfortunately, looping back the buses creates a new problem known as the loop-back problem. When packets are injected onto one or both of the buses, they can continue to travel around the loop past the destination. Data packets can continue looping back around forever unless some mechanism is added to prevent continuous loop-back.

Figure 4:
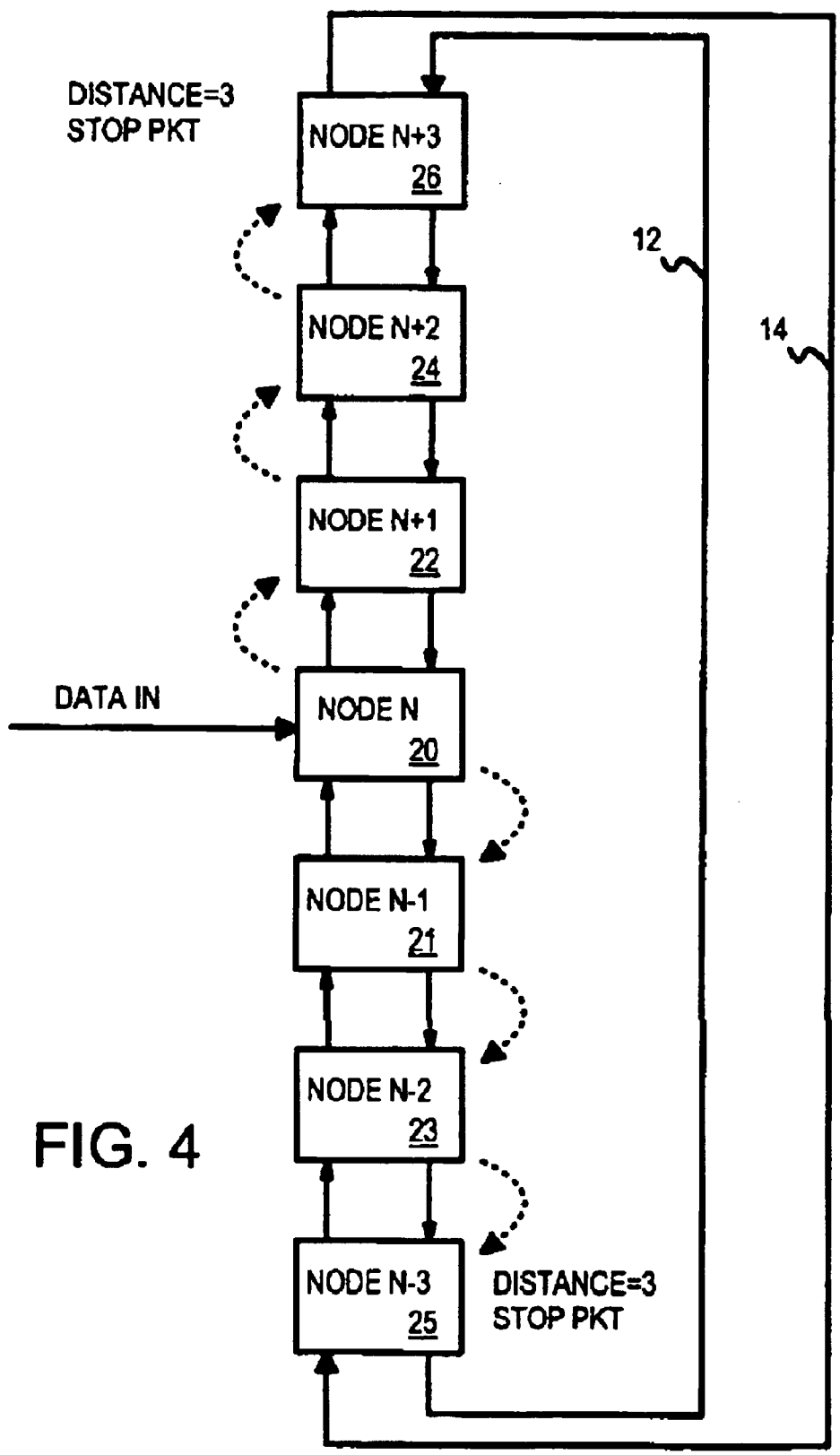
FIG. 4 illustrates a looping bus-based network switch using distance values to remove packets.

One mechanism to solve the loop-back problem is to include a distance value in the packet's header. FIG. 4 illustrates a looping bus-based network switch using distance values to remove packets. In this example a broadcast packet is introduced into node 20. This broadcast packet is to be sent to all nodes on the bus.

A distance value is calculated for the packet. The distance value is half of the number of nodes, or 3. This is the number of hops that the packet is allowed to make before removal. One packet copy is sent upward from node 20 to node 22. At node 22, the distance value is decremented from 3 to 2. Then the packet is sent from node 22 to node 24, and again decremented at node 24 from 2 to 1. The packet is sent from node 24 to node 26. At node 26, the distance value is decremented from 1 to 0. Since the packet's distance value is now 0, it is removed by node 26. This prevents the packet from continuing in the loop to bottom node 25.

The other copy of the packet is sent downward from node 20 to node 21. At node 21, the distance value is decremented from 3 to 2. Then the packet is sent from node 21 to node 23, and again decremented at node 23 from 2 to 1. The packet is sent from node 23 to node 25. At node 25, the distance value is decremented from 1 to 0. Since the packet's distance value is now 0, it is removed by node 25. This prevents the packet from continuing in the loop to top node 26.

All nodes in the switch are reached within 3 hops from the initial node. Each of nodes 20–26 makes a copy of the packet's data and transmits it out from the network switch on the output ports for those nodes. Thus the packet is broadcast to all output ports.

Figure 5:
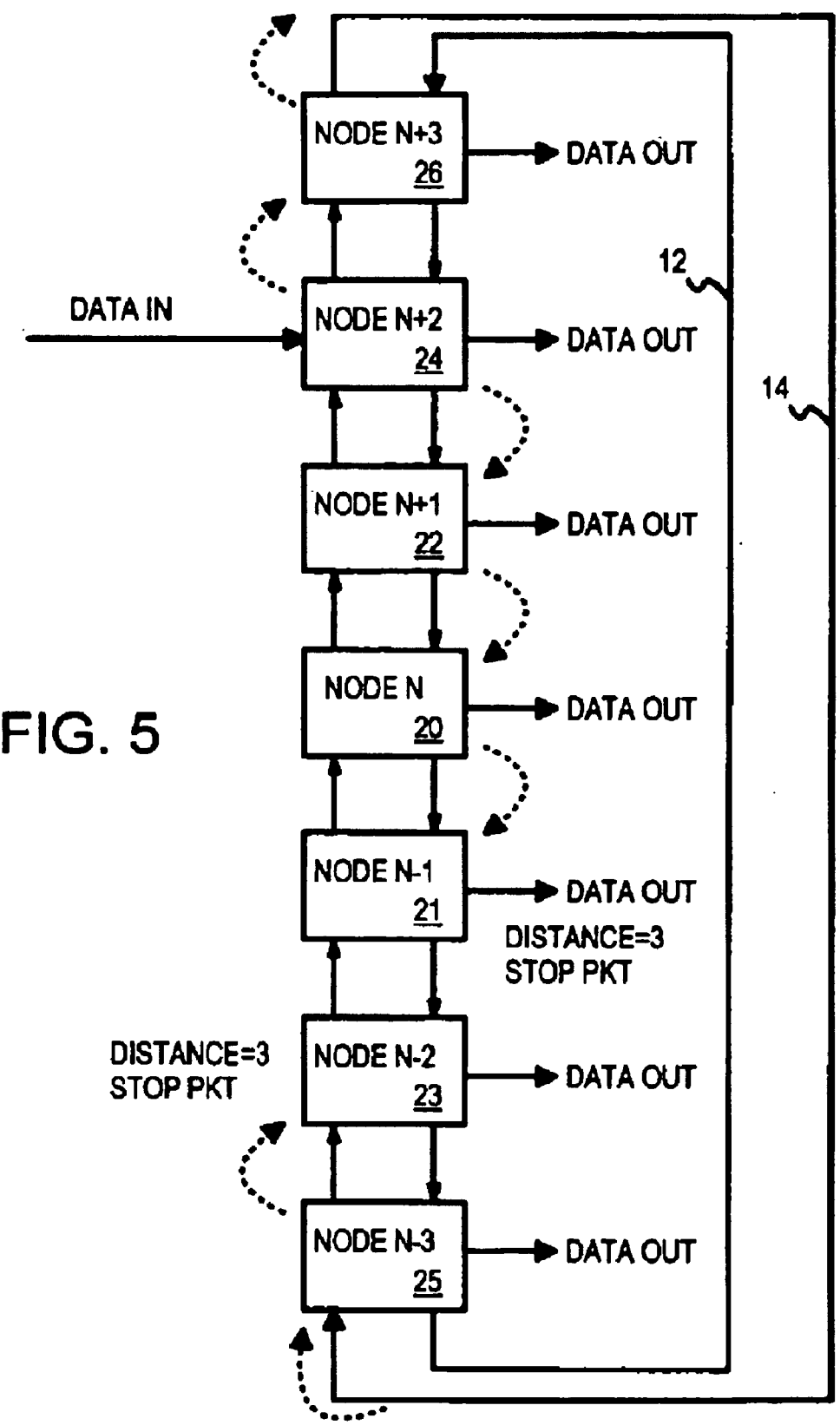
FIG. 5 highlights an example of a packet broadcast from another node in the switch using a distance value to remove packets.

FIG. 5 highlights an example of a packet broadcast from another node in the switch using a distance value to remove packets. The broadcast packet is input to node 24. The distance value of 3 is written into the packet's header, and the packet is duplicated. One copy of the packet is sent downward from node 24 to node 22. At node 22, the distance value is decremented from 3 to 2. The packet is then forwarded from node 22 to node 20, where the distance value is again decremented from 2 to 1. The packet is again forwarded from node 20 to node 21. At node 21, the distance value is decremented from 1 to 0. Since the distance endpoint is reached, the packet is removed by node 21 and does not continue on to node 23.

The other copy of the packet is sent upward from node 24 to top node 26, where the distance value is decremented from 3 to 2. The packet is then sent around loop-back bus 14 to bottom node 25. At bottom node 25, the distance value is again decremented from 2 to 1. The packet is then sent up from node 25 to node 23. At node 23 the distance value is decremented from 1 to 0. Since the distance endpoint is reached, the packet is removed by node 23. Each of nodes 20–26 copies the data from the packet to its output port, allowing the data from the packet to be broadcast to all output ports of the network switch.

Figure 6:
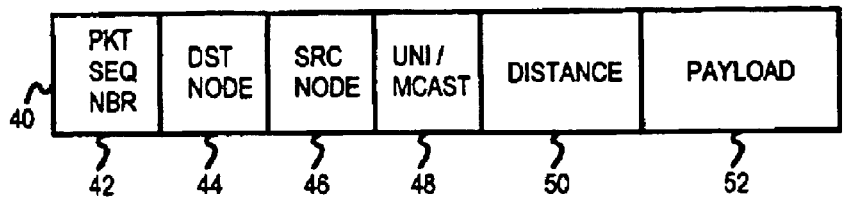
FIG. 6 shows a packet with a distance value that is switched by the looping bus-based network switch.

FIG. 6 shows a packet with a distance value that is switched by the looping bus-based network switch. The data sent to the output port is contained in payload 52. Payload 52 may itself include several layers of headers for external networks, such as an Internet Protocol (IP) header and a Transport-Control-Protocol (TCP) header that are used by TCI/IP packets. Checksums can be appended to the actual data within payload 52, and various signaling information can be included in payload 52.

Packet 40 is an internal packet for use within the bus-based network switch. A proprietary format is used rather than a standard format or protocol since the packet is used internally. The header is formed by the input port logic or controller and removed from payload 52 by the output port logic or controller. The internal header includes fields 42, 44, 46, 48, and 50 and may include other fields not shown.

Sequence field 42 contains a packet sequence number for packet 40. The sequence number indicates the order in which packet 40 fits in a data stream received by the input port. A large packet received by the input port can be divided into several smaller packets 40 for internal transmission over the loop-back buses. At the node coupled to the intended output port, the packets are re-assembled into the sequence indicated by the sequence numbers. Sequence numbers are especially useful when errors occur in packet transmission and packets are retransmitted through the network switch.

Destination field 44 contains an identifier for the node that is coupled to the packet's intended output port. These identifiers are internal addresses that are not visible outside the network switch The identifiers can be node numbers, such as 1, 2, 3, 4, . . . or other codes that uniquely identify one of the nodes.

Source field 46 contains the node number for the source node, which is the node coupled to the input port that received payload 52 contained now encapsulated by packet 40. Packet 40 is injected onto the loop-back buses by the node identified by source field 46.

Mode field 48 contains one or more bits that indicate the type of packet. For example, one encoding of mode field 48 can indicate a unicast packet that is sent to only one destination node. A unicast packet need only be transmitted in one direction using one of the two loop-back buses in the network switch. Another encoding of mode field 48 can indicate a multicast packet that is sent to two or more of the nodes. Such a packet can be replicated by the source node and sent in two directions over the two looping buses, or it can be sent in just one direction, and copied by each destination node until removal by the final node. A broadcast mode can also be supported, where the packet is sent to all nodes. When multicast is used, additional destination fields 44 can be included in packet 40 to identify each destination node.

Distance field 50 contains the distance value for the packet. The distance value indicates how many nodes the packet can travel through before removal. The distance value is initially set to half of the number of nodes in the loop by the input port, and then decremented by each node that the packet passes through. Some variations include decrementing the distance value at the source node rather than the final node, or not decrementing at the source node. Decrementing can occur either before or after the node examines the distance value to decide when to remove the packet. Other embodiments and encodings of the distance value can be substituted.

Figure 7A:
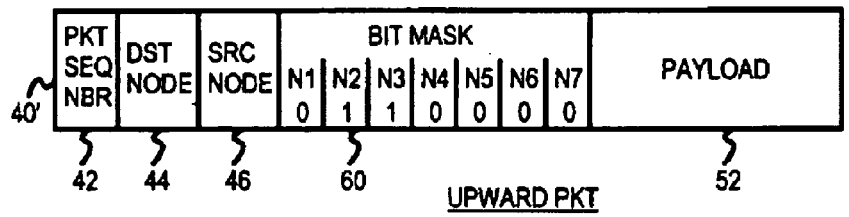
FIGS. 7A, 7B show packets using a bit mask to indicate which nodes in the looping bus-based network switch are to receive the packet.
Figure 7B:
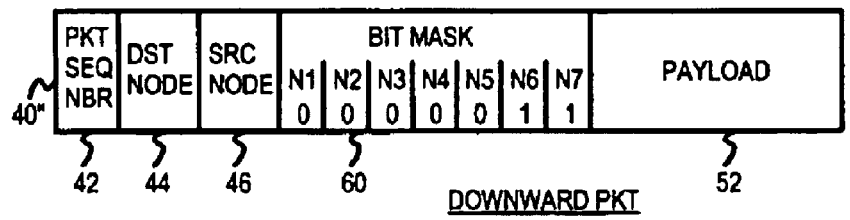

FIGS. 7A, 7B show packets using a bit mask to indicate which nodes in the looping bus-based network switch are to receive the packet. Rather than use a distance value, continuous looping can be prevented by using a bit mask. The bit mask indicates which nodes should receive the packet.

Packet 40' encapsulated payload 52 with sequence field 42, destination field 44, and source field 46 as described earlier. Bit mask field 60 contains a bit mask that indicates which of the nodes is to receive the packet. Bits are set to 1 to indicate that a node is to receive packet 40', but cleared to indicate that the corresponding node does not receive packet 40'.

When each node receives packet 40', it examines bit mask field 60. When the bit in bit mask field 60 that corresponds to the node is set, the node copies the data in payload 52 to its output port. The node also clears the corresponding bit in bit mask field 60 to indicate that the node has already received the data. Once all bits in bit mask field 60 are cleared, packet 40' is removed from the bus since no other nodes need the data in packet 40'.

Different packets are sent upward and downward on the two looping buses. In FIG. 7A, packet 40' is sent upward, while in FIG. 7B, packet 40" is sent downward. Bit mask field 60 in FIG. 7A has the bits set for nodes N2 and N3, with the other bits cleared. In this example, packets 40', 40" are injected by node N4, in the middle of nodes N1 to N7. This corresponds to node 20 of FIG. 4.

Upward packet 40' is sent from node N4 up to node N3. Node N3 sees that its bit in bit mask field 60 is set, and copies the data from payload 52 to its output port. Then node N3 clears bit N3 in bit mask field 60. The packet still has one more bit set in bit mask field 60, so it is sent up from node N3 to node N2. Node N2 sees its bit set, copies the data to its output port, and clears bit N2. Now all bits in bit mask field 60 are cleared, so packet 40' is removed by node N2.

Downward packet 40" is sent from node N4 down to node N5. Node N5 sees that its bit in bit mask field 60 is cleared, and passes packet 40" down to node N6. Node N6 sees that its bit is set, and copies the data from payload 52 to its output port. Then node N6 clears bit N6 in bit mask field 60. The packet still has one more bit set in bit mask field 60, so it is sent down from node N6 to node N7. Node N7 sees its bit set, copies the data to its output port, and clears bit N7. Now all bits in bit mask field 60 are cleared, so packet 40" is removed by node N7.

Bit-mask field 60 is also effective when the packets loop around. The input port needs to have the intelligence to divide the destination nodes into two groups, one group of nodes reached by the upward packet, and the other group of nodes reached by the downward packet, taking into account that one of the packets can loop around from top to bottom, or bottom to top. One packet's bit-mask field is programmed with the nodes reached by the upward packet, while the other packet's bit-mask field is programmed with the nodes reached by the downward packet.

Figure 8:
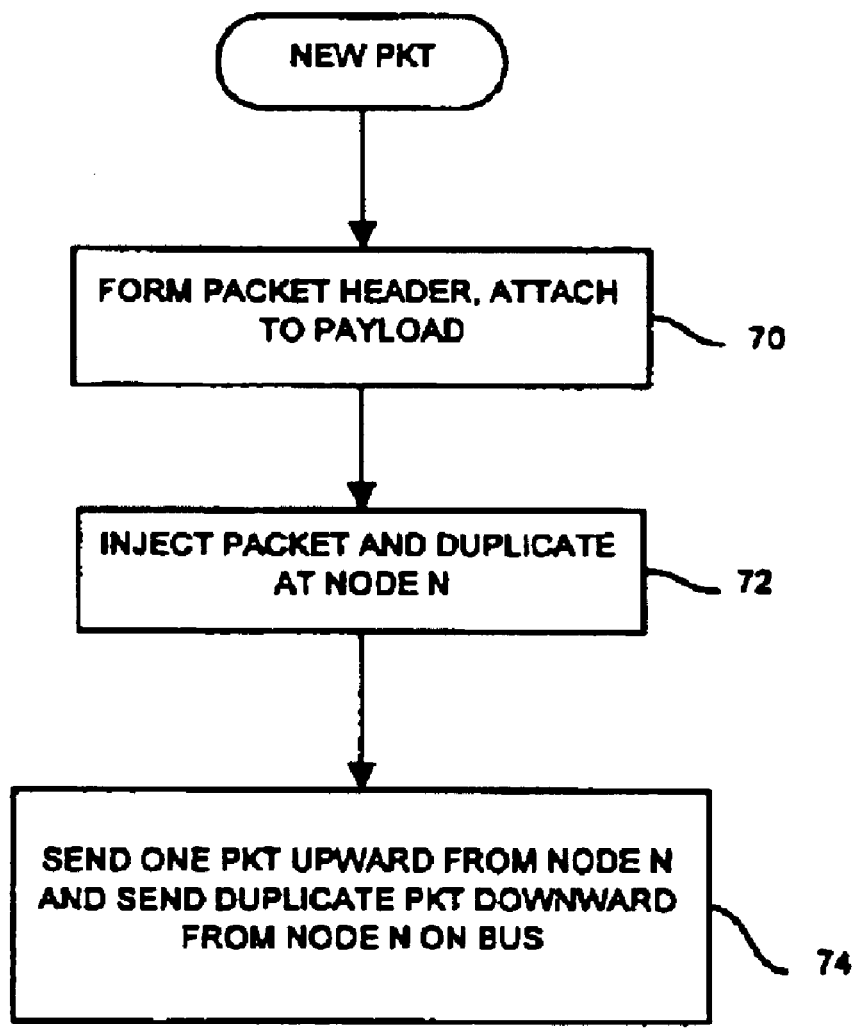
FIG. 8 is a flowchart illustrating packet duplication at an input node.

FIG. 8 is a flowchart illustrating packet duplication at an input node. When data is received at an input port, it is formed into a payload of a switch packet. A header is generated for this data, step 70, and attached to the payload to form the switch packet. The packet is injected into the looping bus at the source node attached to the input port, step 72. When the packet is a unicast packet, it can be sent either upward or downward on one of the two looping buses. The bus with the shortest distance to the destination node is selected.

When the packet is a multicast or broadcast packet being sent to many nodes, the packet is duplicated and sent over both buses so that destinations are reached in both directions. The duplicated packet's header may be modified, such as by setting different bits in a bit-mask, or by specifying a different distance value. The packet travels upward from the source node on one of the looping buses, while the duplicate packet travels downward from the source node on the other looping bus, step 74 to reach all destination nodes.

Figure 9:
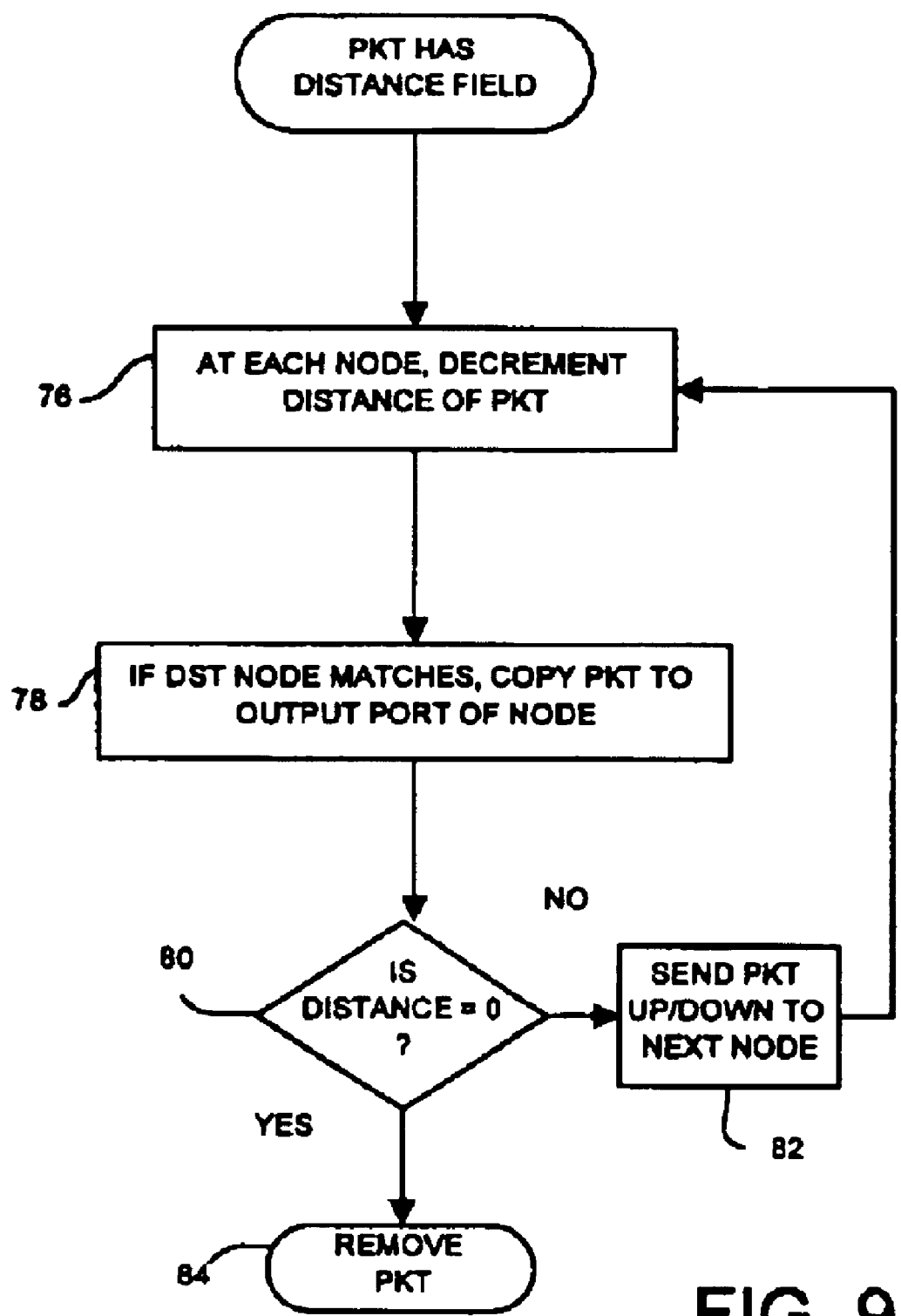
FIG. 9 is a flowchart showing node operation when the switch packet has a distance value.

FIG. 9 is a flowchart showing node operation when the switch packet has a distance value. As the packet arrives at each node, the distance value is decremented, step 76. The destination field in the packet's header is read and compared to the node number for the current node, step 78, to determine if the current node is attached to the indicated destination port. When the packet is a multicast packet, the node number can be compared to several destinations in the packet header. When the destination matches, the packet's payload is copied to the node's output port.

The decremented distance value is then compared to the endpoint, zero, in step 80. When the distance value reaches zero, the packet is removed from the switch and not passed on to the next node in the loop, step 84. When the distance has not yet reached the endpoint (is greater than zero), the switch packet is transmitted from the current node to the next node in the loop, step 82. The procedure is then repeated at the next node.

Figure 10:
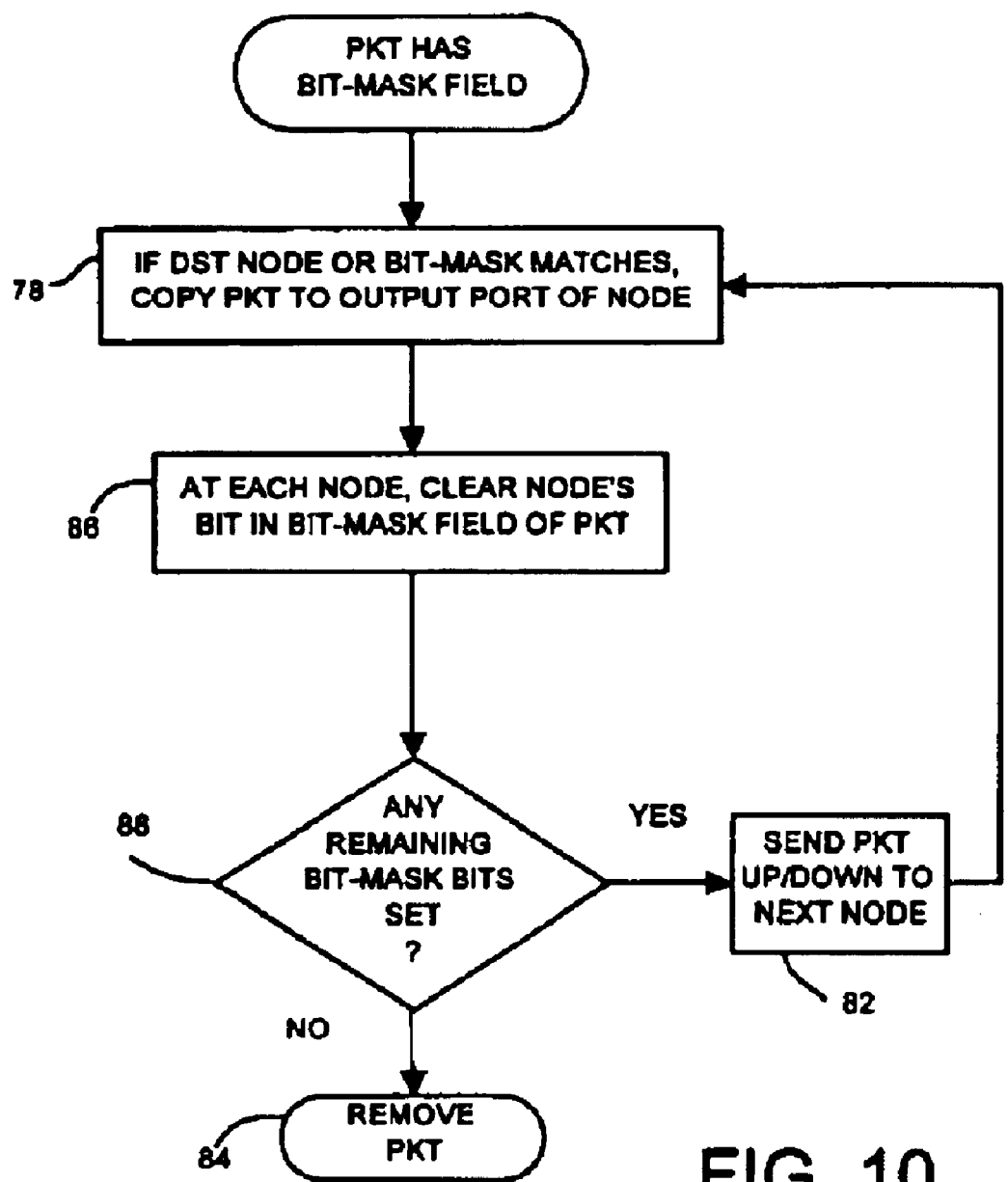
FIG. 10 is a flowchart highlighting operation at a node when the switch packet has a bit-mask field that indicates which nodes should receive the switch packet.

FIG. 10 is a flowchart highlighting operation at a node when the switch packet has a bit-mask field that indicates which nodes should receive the switch packet. Each node can read the node identifier in the packet's destination field and compare it to the node's identifier or number to see if the packet is intended for the current node. When the destination node identifier matches, the packet's payload is copied to the node's output port, step 78.

Another way of determining when the packet is for the current node is to examine the bits in the packet's bit-mask field. When the bit corresponding to the current node is set, a match is signaled and the packet's payload is copied to the node's output port, step 78. Examining the bits in the bit-mask field is especially useful for multicast packets, since the node identifiers for each of many destination nodes do not have to be stored in the packet's header. Instead, only a single bit needs to be set to specify a destination node.

Once the bit mask has been examined, or a copy of the bit mask made for later examination by the node for embodiments that execute step 78 occurs after step 86, the node clears its corresponding bit in the bit mask field, step 86. Clearing the bit indicates that the current node has already received the packet.

The bit mask is then examined to determine if any downstream nodes remain that need to receive the packet, step 88. When any bits in the bit mask are set, the bit mask indicates that the packet still needs to be routed to another node. The current node then sends the packet along the bus to the next node in the loop, in the same direction as before, up or down, step 82. The next node in the loop then repeats the process of examining the bit mask and clears its bit.

When the current node examines the bit mask and finds that all bits are cleared (zero for positive logic, one for inverted logic), then all nodes in this loop direction have already received the packet. The packet is removed by the current node, step 84. This prevents the packet from endlessly looping around the loop of nodes.

Figure 11:
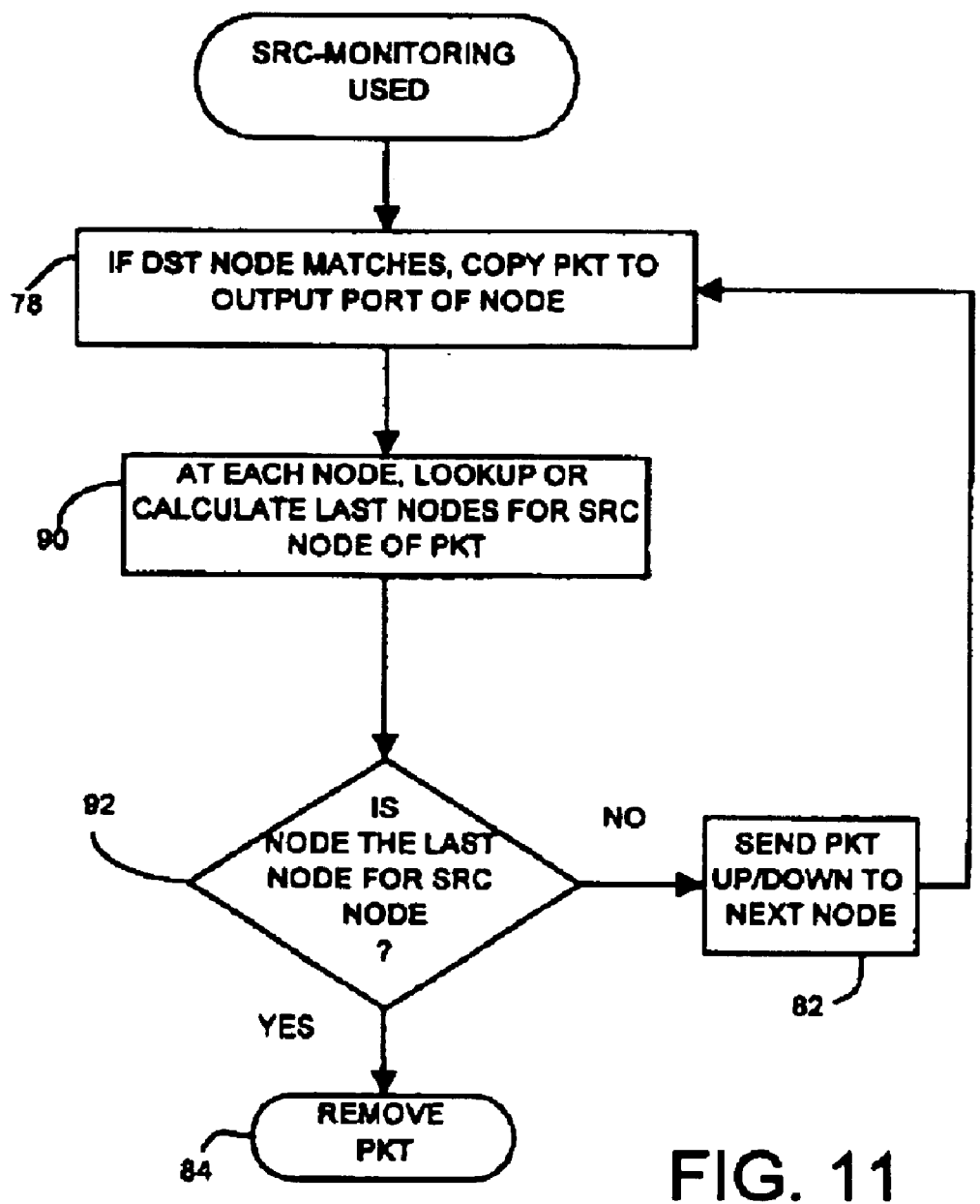
FIG. 11 is a flowchart highlighting source-monitoring at each node to remove packets that have traveled halfway around the loop of nodes.

Another method to limit travel of packets and prevent endless looping is to use source monitoring. FIG. 11 is a flowchart highlighting source-monitoring at each node to remove packets that have traveled halfway around the loop of nodes.

At each current node, the header for a received switch packet is read. The node identifier in the header's destination field is compared to the node's identifier or address, step 78. When the node identifiers match, the packet's payload data is intended for the current node, and the current node copies the packet's payload to the output port served by the current node.

When the packet is a unicast packet, the payload is intended for just one node, so unicast packets can be removed when a node match occurs. However, for the more general case of a multicast packet, another method, such as a distance value, a bit mask, or source monitoring must be used to determine when to remove packets. For source monitoring, the source filed in the switch packet's header is used. The source field contains an identifier for the source node, the node connected to the input port that received the packet's payload and formed the switch packet as described for FIG. 8.

As the switch packet is sent in one direction along the looping bus, each node performs the procedure of FIG. 11. After determining whether to copy the packet's payload to the node's output port, step 78, the node reads the source node identifier from the packet header's source field. This source identifier is an address or other unique identifier for the source node. In an embodiment using a lookup table, this source identifier is used as an index into the table, selecting one row of the table, step 90. The selected row has one or two last-node entries. The last-node entry is a node identifier for the node that should remove the packet. Two last-node entries can be used, one for each direction of packet travel. When the current node's identifier matches the last-node identifier from the table, step 92, the packet is removed, step 84.

In another embodiment without a lookup table, each current node stores one or two source-node identifiers for soured nodes halfway around the loop. For example, for a looping bus with 100 nodes, the current node 30 would store the identifiers for source nodes 79 and 80, which are half-way (50 nodes) around the loop from node 30. The packet's source field is read, step 90, and compared to the stored source node identifier, step 92, to determine when the packet has traveled half-way around the loop. When the source node identifiers match, the packet is removed, step 84. Otherwise, the packet is sent on to the next node in the loop, step 82, either up or down.

Alternate Embodiments

Several other embodiments are contemplated by the inventor. For example two or more of the packet-removal methods can be combined or used at the same time, such as using a distance value and a bit mask. This provides a backup in case of an error in transmitting the packet header when the bus operates at a very high speed. The distance value and packet removal causes the looping bus to act as a virtual bus segment without loop back, since packets do not loop completely around the full loop. Some nodes may have only an input port or only an output port, or may have no I/O ports at all, or no active ports. The bit mask may be encoded to occupy less space in the header, such as by using a binary number that is decoded to the individual bits of the bit mask.

The switch can be designed primarily for multi-cast packets. It is believed that in the future the Internet will mostly carry multi-cast packets, since multicast is used for Internet TV, Radio, and Video Conferencing. Each multi-cast packet can be destined to a group of destinations. A bit in the bit mask, or when encoded, a binary number, can represents a group of nodes, rather than a single node. Each node may use the binary number to search a look up table and determine if it needs to make a copy of the packet and transmit out to the output port. Using a group number is preferable to using a bit mask for larger switches, because a 100 node switch needs 100 bits worth of bit mask. In contrast, a 20-bit binary number is more condensed, being able to address one million groups of nodes.

The second loop bus is normally used to reach nodes in the opposite direction as the first loop bus. However, when a link failure or break occurs on one of the loop buses, all nodes can still be reached by the other bus. The distance values can be adjusted when a failure is detected so that packets continue to travel around the loop to reach the node at the far end of the link failure. For example, on a 100 node switch, a link failure occurs between nodes 60 and 61 on the upward bus. When a packet is injected at node 50, only nodes 51 to 60 can be reached on the upward bus, so the upward distance is set to 10. The downward distance is increased from 50 to 88 to allow the downward packet to loop around and reach nodes 99 to 61 after reaching nodes 49 to 1.

The distance value can be adjusted in a variety of ways. A larger initial distance value can be used and then decremented until a predetermined end point is reached. For example, an initial distance value of 103 can be used, and then the packet removed when the distance value reaches 100. The distance value can also be incremented or adjusted by a number other than one, and the endpoint or initial values adjusted accordingly. The distance value can even be counted in a sequence other than using binary numbers, such as counting in gray code. Various encodings of the distance value or combinations with other fields in the header can also be substituted. The distance value can differ for the up and down directions, and it can be rounded up or down.

Each node could be connected to more than one input or output port. For example, an Octo-Ethernet media-access-controller (MAC) chip attached to a single switch node drives 8 different output ports for the switch node. A multi-cast packet can be destined for a subset of the ports attached to the switch node. A single bit in the packet header can identify the switch port. When the packet is destined to only 3 of the 8 Ethernet ports, a further look up in a table can resolve which of the 8 ports to route the packet to. The Octo-MAC chip can route an input packet back out of one of its 8 ports without using the network switch. Switch packets could be sent to the appropriate output port connected to the node, or copied to all output ports at the destination node.

Source-monitoring can be done in a variety of ways. Identifiers can be encoded in various ways. The identifier could be the identifier of the source node, or of the removal node, or some unrelated number that is matched to indicate removal. Subtraction of the current node's identifier from the source node identifier could be done to calculate a distance value that is then compared to the half-distance of the loop to determine when to remove packets. Other calculations could also be substituted.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A bus-based network switch comprising:
   a plurality of switch nodes, each switch node for receiving a data payload from an input port or for transmitting a data payload to an external network device through an output port;
   a first bus for sending switch packets with the data payload in a first direction among the plurality of switch nodes, the first bus being divided into links, each link for transferring a switch packet between two of the switch nodes;
   a second bus for sending switch packets with the data payload in a second direction among the plurality of switch nodes, the second bus being divided into links, each link for transferring the switch packet between two of the switch nodes;
   wherein the plurality of switch nodes are arranged in a continuous loop wherein a destination switch node in the plurality of switch nodes can be reached from any other switch node in the plurality of switch nodes both by following the continuous loop in the first direction and by following the continuous loop in the second direction; and
   a packet limiter that limits a number of switch nodes that the switch packet travels through from a source switch node that receives the data payload to the destination switch node that transmits the data payload from the switch packet to the output port;
   wherein the packet limiter limits the number of switch nodes to half or less of the total number of switch nodes in the plurality of switch nodes,
   whereby the switch packet travels through a limited number of the switch nodes and
   whereby the switch packet travels no more than half-way around the continuous loop of switch nodes.

2. The bus-based network switch of claim 1 wherein the switch packet comprises a header and the data payload, the header including a destination identifier that uniquely identifies the destination switch node from other nodes in the plurality of switch nodes;
   wherein the header is attached to the data payload before the source switch node sends the switch packet over the first or second bus;
   wherein the header is removed from the data payload after the destination switch node receives the switch packet but before the data payload is transmitted out the output port without the header.

3. The bus-based network switch of claim 2 wherein the packet limiter is a distance value in the header that specifies a limited number of switch nodes that the switch packet can travel through before the switch packet is removed by a switch node.

4. The bus-based network switch of claim 3 wherein each switch node receiving a switch packet decrements the distance value; wherein a switch node removes a switch packet with a distance value that is below a
   removal threshold value by not sending the switch packet to a next switch node, whereby the distance value is decremented for each switch node the switch packet passes through until the removal threshold value is reached and the switch packet is removed.

5. The bus-based network switch of claim 2 wherein the packet limiter is a bit-mask in the header, the bit mask identifying one or more of the switch nodes that are to receive the data payload in the switch packet.

6. The bus-based network switch of claim 5 wherein each switch node copies the data payload from the switch packet when a bit in the bit mask corresponding to the switch node is set and clears the bit before sending the switch packet on to a next switch node.

7. The bus-based network switch of claim 6 wherein the switch packet is removed by a switch node when all bits in the bit mask are cleared.

8. The bus-based network switch of claim 2 wherein the packet limiter is a source monitor in each switch node, the source monitor comparing a removal identifier in the header to a predetermined identifier to indicate when the switch node is to remove the switch packet and not send it to a next switch node.

9. The bus-based network switch of claim 8 wherein the removal identifier is a source node identifier that identifies a source switch node that received the data payload in the switch packet from an input port attached to the source switch node.

10. The bus-based network switch of claim 8 wherein a broadcast switch packet is duplicated to form a first packet and second packet with a same data payload, with the first packet sent from a source switch node over the first bus in the first direction while the second packet is sent from the source switch node over the second bus in the second direction, whereby broadcast packets are sent in both directions over both the first and second bus.

11. The bus-based network switch of claim 10 wherein a unicast switch packet intended for only one output port is transmitted over either the first bus or the second bus but not over both buses, whereby the unicast switch packet is sent in only one direction.

12. A method for switching data using a bus-based network switch with switch nodes comprising:

receiving at an input port coupled to a source switch node a data payload for switching to an output port coupled to a destination switch node;

generating a header for a switch packet that contains the data payload received by the input port, the header identifying the destination switch node;

injecting the switch packet at the source switch node and sending the switch packet to a next switch node along a first bus in a first direction toward the destination switch node or sending the switch packet to a next switch node along a second bus in a second direction toward the destination switch node, the destination switch node being reachable by both the first and the second bus;

at each next switch node along the first bus when the switch packet is sent over the first bus:

receiving the switch packet from a first-bus input to the next switch node;

examining the header of the switch packet to determine if the data payload is intended for an output port coupled to the next switch node;

copying the data payload but not the header to the output port coupled to the next switch node when the header indicates that the data payload is for the output port;

reading a field in the header to determine if the switch packet should be removed;

sending the switch packet out a first-bus output to another next switch node over the first bus when the switch packet is not to be removed, but not sending the switch packet out the first-bus output when the next switch node determines that the switch packet is to be removed;

at each next switch node along the second bus when the switch packet is sent over the second bus:

receiving the switch packet from a second-bus input to the next switch node;

examining the header of the switch packet to determine if the data payload is intended for an output port coupled to the next switch node;

copying the data payload but not the header to the output port coupled to the next switch node when the header indicates that the data payload is for the output port;

reading a field in the header to determine if the switch packet should be removed; and sending the switch packet out a second-bus output to another next switch node over the second bus when the switch packet is not to be removed, but not sending the switch packet out the second-bus output when the next switch node determines that the switch packet is to be removed, whereby switch packets are routed over the first or second bus.

13. The method of claim 12 when the switch packet is intended for many output ports and further comprising:

duplicating at least part of the switch packet including the data payload to generate a second switch packet;

injecting the switch packet at the source switch node and sending the switch packet to a next switch node along the first bus in the first direction toward the destination switch node;

also injecting the second switch packet at the source switch node and sending the second switch packet to a next switch node along a second bus in a second direction toward the destination switch node, whereby switch packets are sent over the first bus in the first direction and over the second bus in the second direction to reach output ports.

14. The method of claim 12 wherein the first direction is opposite to the second direction.

15. The method of claim 14 wherein reading a field in the header to determine if the switch packet should be removed comprises:

reading and decrementing a distance value in the header that indicates a number of next switch nodes that is half or less of a total number of switch nodes; and comparing the distance value to a threshold.

16. The method of claim 14 wherein reading a field in the header to determine if the switch packet should be removed comprises:

reading a bit mask in the header that indicates which switch nodes are destination switch nodes;

resetting a bit in the bit mask for the next switch node; and wherein the switch packet is removed by the next switch node when no bits in the bit mask indicate remaining destination switch nodes.

17. The method of claim 14 wherein reading a field in the header to determine if the switch packet should be removed comprises:

reading a removal field in the header that identifies a next switch nodes that is to remove the switch packet.

18. A network switch comprising:

a plurality of switch node means, coupled to input-port means for receiving data sent to the network switch and output-port means for transmitting data from the network switch, each switch node means having a first-bus input, a first-bus output, a second-bus input, and a second-bus output;

first bus means for sending packets partially along a loop of the plurality of switch node means in a forward direction, having a plurality of first link means for sending the packets between two switch node means, each first link means being coupled to the first-bus output of a switch node means and to a first-bus input of an adjacent switch node means;

second bus means for sending packets partially along the loop of the plurality of switch node means in a reverse direction, having a plurality of second link means for sending the packets between two switch node means, each second link means being coupled to the second-bus output of a switch node means and to a second-bus input of an adjacent switch node means; and removal means, in each switch node means, for determining if the switch node means is halfway around the loop from a source switch node means that received the data from the input-port means, the removal means preventing the packet from being sent by the first or second link means to another switch node means when the packet is removed, whereby packets are removed halfway around the loop.

19. The network switch of claim 18 wherein the removal means comprises means for reading a field in a header of the packet, and means for comparing the field to a predetermined value to determine when to remove the packet.

* * * * *